United States Patent [19]

Igaki

[11] Patent Number: 5,506,681
[45] Date of Patent: Apr. 9, 1996

[54] METHOD FOR DETECTING A REFERENCE POSITION AND DISPLACEMENT DETECTOR USING THE SAME

[75] Inventor: Masahiko Igaki, Tokyo, Japan

[73] Assignee: Canon Kabushiki Kaisha, Tokyo, Japan

[21] Appl. No.: 188,342

[22] Filed: Jan. 25, 1994

Related U.S. Application Data

[63] Continuation of Ser. No. 801,888, Dec. 3, 1991, abandoned.

[30] Foreign Application Priority Data

Dec. 4, 1990 [JP] Japan .................................. 2-400390

[51] Int. Cl.$^6$ .................................................. G01B 11/14
[52] U.S. Cl. ........................................ 356/373; 250/237 G
[58] Field of Search ................................. 356/373, 374, 356/375; 250/237 G; 33/707

[56] References Cited

U.S. PATENT DOCUMENTS

| | | | |
|---|---|---|---|
| 3,763,372 | 10/1973 | Fedotowsky et al. | 250/237 G |
| 4,097,734 | 6/1978 | Erickson | 250/237 G |
| 4,263,506 | 4/1981 | Epstein | 250/231 SE |
| 4,477,189 | 10/1984 | Ernst | 356/374 |
| 4,758,720 | 7/1988 | Aubele et al. | 250/237 G |
| 5,026,985 | 6/1991 | Ishizuka et al. | 250/231.16 |
| 5,059,791 | 10/1991 | Ishizuka et al. | 250/236 G X |
| 5,129,725 | 7/1992 | Ishizuka et al. | 250/237 G |

FOREIGN PATENT DOCUMENTS

| | | |
|---|---|---|
| 0341743 | 11/1989 | European Pat. Off. . |
| 0439804 | 8/1991 | European Pat. Off. . |
| 3542514 | 6/1987 | Germany . |
| 62-5130 | 1/1987 | Japan . |
| 62-133306 | 6/1987 | Japan . |
| 63-81212 | 4/1988 | Japan . |

*Primary Examiner*—Richard A. Rosenberger
*Assistant Examiner*—K. P. Hantis
*Attorney, Agent, or Firm*—Fitzpatrick, Cella, Harper & Scinto

[57] ABSTRACT

A displacement detector includes a light generation source for generating light, a scale to be irradiated by the generated light and displaceable relative to the irradiated light, a first detection device having a photo-sensing element for detecting light transmitted through the scale for detecting displacement information of the scale, a mark having a focusing or light-condensing function formed integrally with the scale, and a second detection device having a photo-sensing element for sensing the light-condensed by the mark for detecting a reference position of the scale.

8 Claims, 10 Drawing Sheets

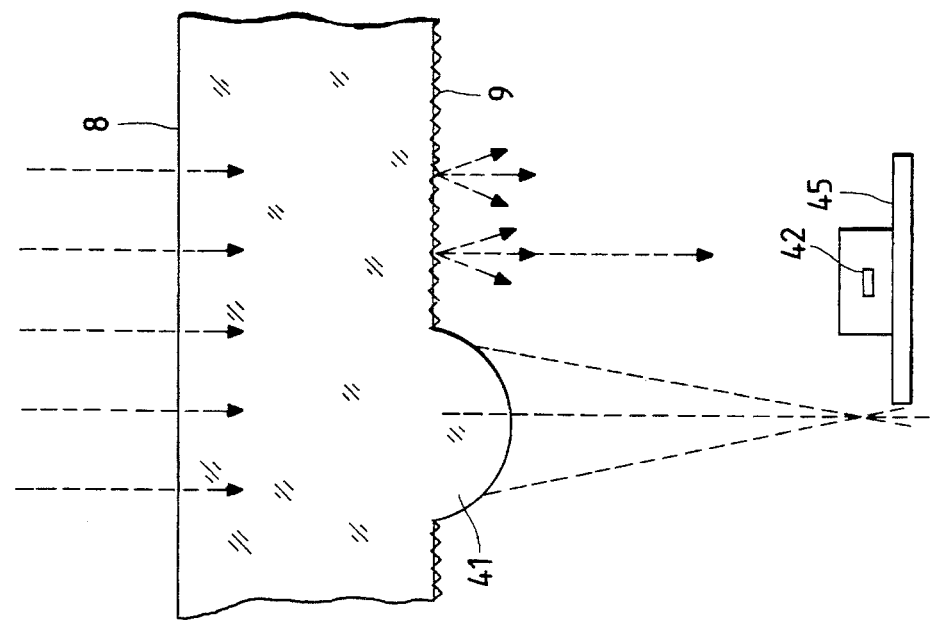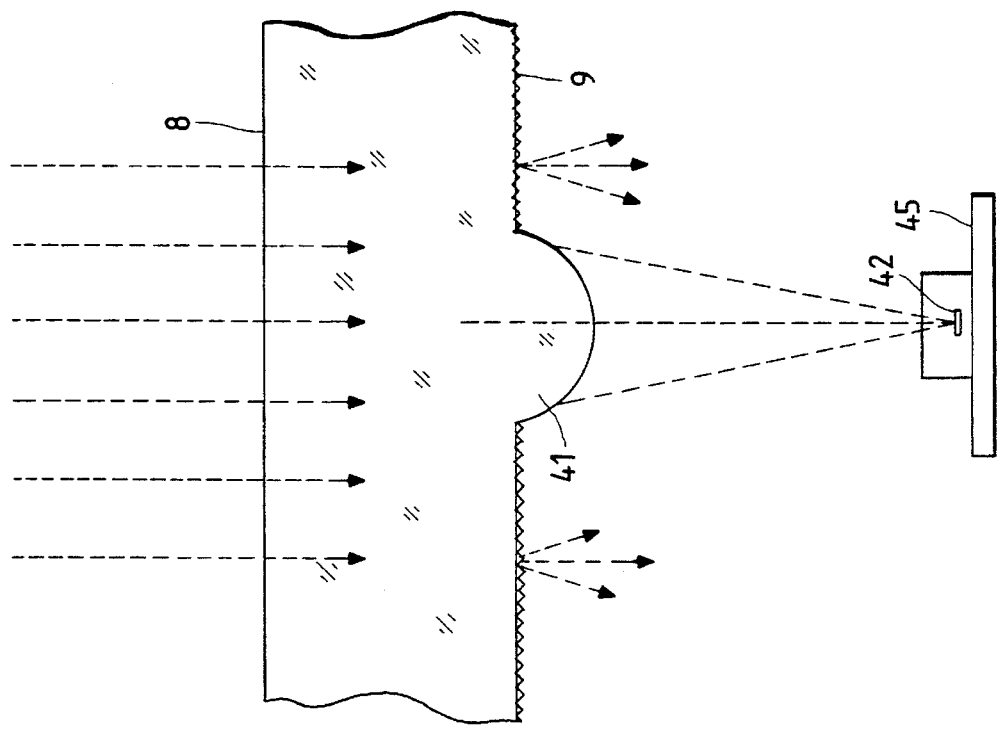

5,506,681

METHOD FOR DETECTING A REFERENCE POSITION AND DISPLACEMENT DETECTOR USING THE SAME

This application is a continuation of application Ser. No. 07/801,888, filed Dec. 3, 1991, now abandoned.

BACKGROUND OF THE INVENTION

1. Field of the Invention

The present invention relates to a technique to determine a reference point which is an origin point in a displacement detector such as an encoder which detects displacement of an optical scale.

2. Related Background Art

A rotary encoder for measuring a rotation angle or a rotation speed of a disk-shaped optical scale, which is an example of a displacement detector, is disclosed in U.S. Pat. Nos. 5,026,985, 5,059,791, 4,263,506 and 4,477,189.

Japanese Laid-Open Patent Application No. 63-81212 discloses a rotary encoder which uses a cylindrical optical scale having a slit-like grating formed on a side thereof to measure a rotation angle thereof at a relatively high resolution with a simple construction. By the rotary grating being cylindrical, no alignment of two gratings (a rotary grating and a fixed grating) which has been required in the prior art is necessary, and a cancellation effect for a detection error due to the eccentricity of a rotating shaft is attained. Thus, the high precision and the simplicity in mounting are attained. Such advantage is achieved by providing a focusing optical system in the scale (in a hollow area) and projecting, by the focusing optical system, an image of the grating in a first region on the side of the scale to the grating in a second region on the opposite side of the scale to the first region with respect to the rotating shaft of the scale.

On the other hand, an improved encoder which uses a similar slit grating or a cylindrical optical scale having a convexo-concave grating with a regular sloped surface such as a V-shaped groove formed on a transparent cylindrical member is disclosed in pending U.S. application Ser. No. 634,045 filed on Dec. 26, 1990. It utilizes a principle of Talbot effect of the grating instead of the focusing optical system. According to such encoder, in addition to the effect of the prior art described above, it can further improve the simplification of the overall configuration, the volume reduction and the inertia reduction.

When the above encoder is used in various systems, it is desirable to determine a reference position or an origin point of the rotation. By obtaining an origin point signal, an encoder capable of detecting an absolute position is provided. Configurations to obtain the origin point signal are shown in the above patents.

SUMMARY OF THE INVENTION

It is an object of the present invention to provide a technique to produce a reference position signal with a high precision and a simple construction.

It is another object of the present invention to reduce the number of parts, to facilitate the assembly and to reduce the size of a displacement detector producing a reference position signal.

Other objects of the present invention will be apparent from the following description of the preferred embodiments of the present invention.

BRIEF DESCRIPTION OF THE DRAWINGS

FIGS. 1A and 1B show enlarged isolated portions of the top view in FIG. 1,

FIG. 4 illustrates an operation of the detection of a reference position signal, FIG. 5 illustrates an operation of the detection of the reference position signal.

DETAILED DESCRIPTION OF THE PREFERRED EMBODIMENTS

Figure 1:
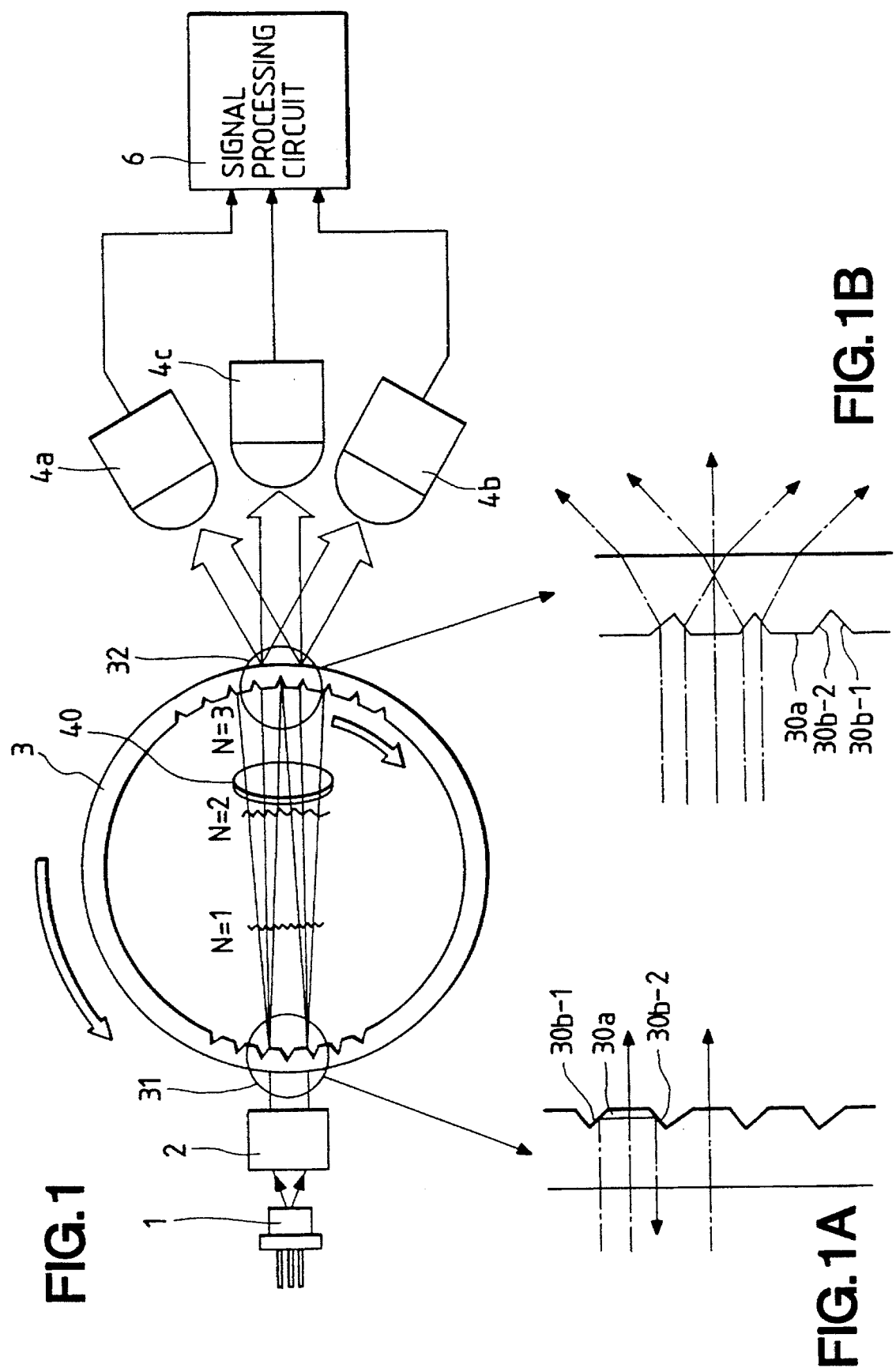
FIG. 1 shows a top view of an embodiment of the present invention.
Figure 2:
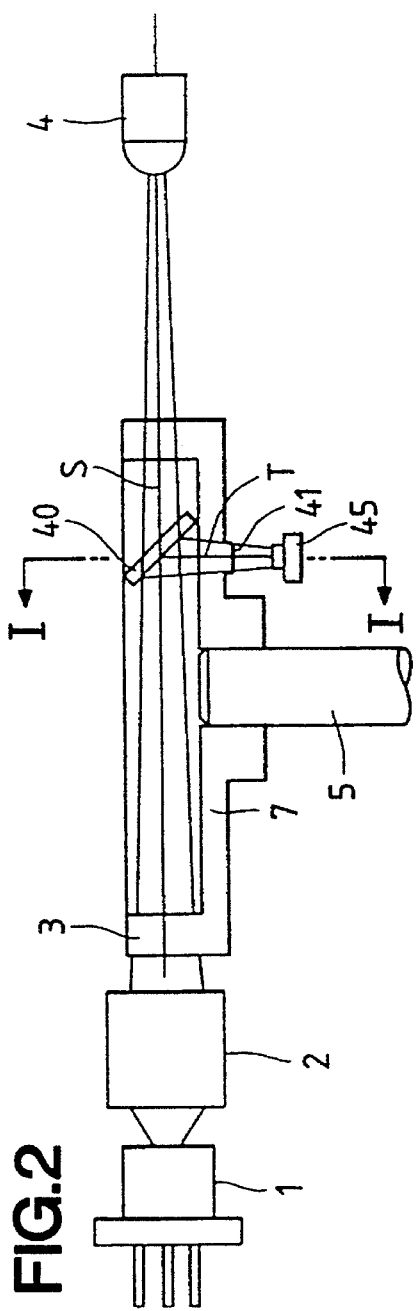
FIG. 2 shows a side view of the embodiment.
Figure 10:
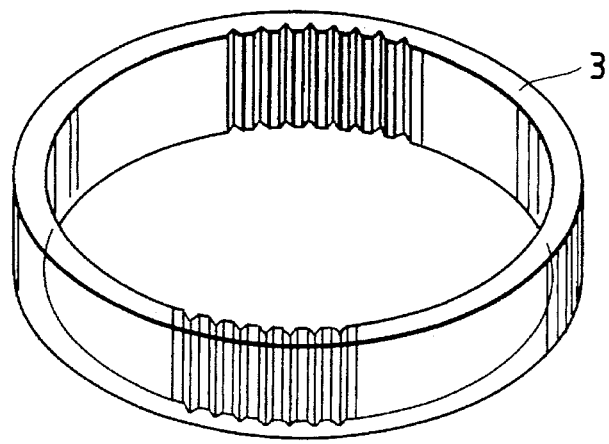
FIG. 10 shows an optical scale in the embodiment.

An embodiment of the present invention is now explained in detail with reference to the drawings. FIG. 1 shows a top view of an embodiment of the rotation detector of the present invention and FIG. 2 shows a side view thereof. In FIG. 1, numeral 1 denotes a semiconductor laser generating a coherent light beam having a wavelength $\lambda$ (=780 nm). Numeral 2 denotes a collimator lens system converting a divergent light beam emitted from the semiconductor laser 1 into a substantially parallel light beam. Light irradiation means comprises the semiconductor laser 1 and the collimator lens system 2. Numeral 3 denotes a rotary optical scale having a cylindrical grating, which is rotated in either direction of the arrows. The scale 3 is coupled to a rotating drive shaft 5 of a motor at a center of a bottom 7 and used as an optical scale for detecting a rotation angle of the drive shaft 5 or the like. FIG. 10 shows a perspective view of the scale 3. The scale 3 is made of a light transmitting optical material. At least the grating region of the scale 3 has light transmittancy. A number of V-shaped grooves are arranged at a constant pitch over the entire circumference on an inner side of the cylindrical scale 3 to form the grating region. Returning to FIG. 1, numeral 40 denotes a half-mirror (beam splitter) which is positioned in the cylindrical scale 3 and obliquely fixed thereto and splits a portion of an incident light to reflect it downward. Photo-detectors 4a, 4b and 4c which are photo-sensing means for detecting the rotating information of the scale are positioned at a position opposite to the light irradiation means with respect to the scale 3. Output signals of the respective photo-detectors are supplied to a signal processing circuit 6 comprising a rotation pulse count circuit, a rotation direction discrimination circuit, a signal interpolation circuit and a reference position signal generation circuit.

In FIG. 2 showing a side view, a light beam split downward by the half mirror 40 is directed to a reference position detecting mark 41. The mark 41 is formed on a bottom surface of the bottom 7 of the scale at one point in one revolution to form a convex area having a focusing, or light-condensing, function like a cylindrical lens extending transversely to the circumferential direction. The convex area has the merit of being formed in the same process as that of the V-shaped grooves in the grating region of the scale 3. Numeral 45 denotes a photo-detector for detecting the light transmitted through the mark 41 to obtain a reference position signal. The photo-detector output signal is supplied to the signal processing circuit 6 producing the reference position signal. The original point of the rotation is derived from the reference position signal. The count value of the count circuit is reset by the reference position signal, thereby to determine the rotation angle from the original point or the absolute value of amount of rotation.

Enlarged views shown in the bottom of FIG. 1 show a detail of the grating region of the scale 3. The V-shaped grooves and the plane areas are alternately arranged to form the grating. The V-shaped grooves with a number of n are arranged on the inner side of the cylinder at a constant pitch p (rod) along the circumference (n×p=2π rod). The V-shaped groove has a width of ½·P (rod). Each of the two planes consisting of the V-shaped groove has a width of ¼·P (rod). Each inclined plane is inclined at an angle θ with respect to a line connecting the bottom and the center of the V-shaped groove, the angle being not less than a critical angle (θ=45 degrees in the present embodiment).

A distance d (an inner diameter of the scale) along the optical axis between the grating in a first region 31 of the scale 3 and the grating in a second region 32 is selected so as to satisfy:

$$d = N \cdot P^2/\lambda \quad (N=3)$$
$$P = \pi d/n \quad (n: \text{total number of slits})$$

where P is a grating pitch and λ is a wavelength. By setting the diameter d of the scale 3, as above the image of the grating in the first region 31 on the side of the scale 3 can be directly projected onto the grating in the second region 32, without focusing optical system in the hollow of the scale 3. The projected grating image is so called as a Fourier image, which is produced by a self-focusing of the image due to a light diffraction phenomenon. In the present embodiment since the scale 3 is cylindrical, the Fourier image tends to be curved and its contrast is reduced to some degree. However, there is no practical problem if the light irradiation means (1 and 2) and the scale 3 are constructed so as to satisfy:

$$(N-¼)P^2\lambda < d < (N+¼)P^2/\lambda \quad (N: \text{natural number})$$

$$P=\pi d/n \quad (n: \text{total number of slits})$$

In the present embodiment, the material of the scale 3 is plastic and the scale 3 is produced by an injection molding method or a compression molding method to facilitate mass production. Accordingly, it provides low cost manufacturing method as compared with the conventional photolithography process.

In the encoder of the present embodiment, as external environmental temperature changes, the diameter d of the scale, the grating pitch P and the wavelength λ of the semiconductor laser change slightly. So, there is some possibility that relative positional shift between the focusing position of the Fourier image and the grating plane may happen to cause the reduction of the S/N ratio of the detection signal. For example, as the temperature rises, the diameter d of the scale increases, the pitch P of the grating increases accordingly, and further, the wavelength λ shifts to the long wavelength side. The position L of the Fourier image changes by a factor of $p^2/\lambda$ as derived from the equation $L=N \cdot P^2/\lambda$. Therefore, the material of the scale and the characteristic of the semiconductor laser are selected so that the change (Δd) of the diameter d of the scale and the displacement (ΔL) of the Fourier image by the temperature change are as close as possible, whereby the relative positional shift between the position of the grating plane and the focusing position of the Fourier image can be reduced and the S/N ratio of the detection signal does not deteriorate even if the external temperature changes. In the semiconductor laser having the wavelength of 780 nm used in the present embodiment, the wavelength variation is approximately 10 nm for the temperature change of 50° C. The material of the scale is preferably one having a large thermal expansion coefficient. In the present embodiment, the material of the scale 3 is plastic (acrylic resin having n=1.49). Since a thermal expansion coefficient of the plastic material is larger than that of glass or the like, the plastic material has an advantage of the reduction of the S/N ratio of the output signal by the temperature change being smaller. Therefore, it is very suitable for the material of the scale of the encoder of the present embodiment because of both this advantage and the advantage of its low cost.

The light source which may be used in the present invention is not limited to the semiconductor laser. For example, the semiconductor laser 1 in FIG. 1 or FIG. 2 may be replaced by a point light source LED. Further cost reduction is attained by using the LED which is less expensive than the semiconductor laser.

A principle of measurement of the rotation information in the present embodiment is now explained with reference to FIG. 1. The light beam from the semiconductor laser 1 is converted to a convergent light beam by adjusting the position of the collimator lens system 2. The convergent light beam is incident on the first region 31 of the scale 3. The convergent light beam is used because the side plane of the scale 3 has a refractive power corresponding to a concave lens due to a difference between the curvature of the outer side plane and that of the inner side plane. The light having entered the scale is substantially parallel by the concave lens action.

As shown in the enlarged left view of FIG. 1, the light beam which reaches the grating 30a in the first grating region passes through the plane 30a and enters the cylinder. The light beam which reaches the grating plane 30b-1 is totally reflected toward the plane 30b-2 because the inclination angle is larger than the critical angle. It is also totally reflected at the plane 30b-2. Thus, the light beam which reaches the plane 30b-1 does not enter the rotating member, but it is returned to the substantially incident direction. Similarly, the light beam which reaches the plane 30b-2 is also returned after the repetition of the total reflection. Accordingly, the light beams which reach the two inclined planes 30b-1 and 30b-2 of the V-shaped groove in the first region 31 do not go into the cylinder but they are reflected, and only the light beam which reaches the plane 30a goes into the cylinder. Thus, in the first region 31, the diffraction grating with V-shaped groove has the same function as that of a transmission type amplitude grating.

The light beam is diffracted at the grating in the first region 31, and diffracted light beams of 0-order, ±1-order, ±2-order and so on are generated by the grating. By the interference of two or three light beams of 0-order and ±1-order, the Fourier image of the grating in the first region 31 is focused in the scale 3. The Fourier image is repeatedly focused behind the grating plane at positions corresponding to integer multiples of a distance L. In the present embodiment, the wavelength λ of the light source, the grating pitch P and the position of the collimator lens 2 are selected so that the third (N=3) Fourier image is focused on the grating plane in the second region 32. The brightness pitch of the Fourier image is equal to the grating pitch P in the first region 31 and the second region 32.

The light beam is split into two directions S and T by the half-mirror 40 which is arranged to go into the cylinder (FIG. 2). The light beam having passed through the half-mirror 40 to go straight in the direction S is incident on plane 30a in the second region 32, and it passes through the plane 30a to reach the photo-detector 4c since the incidence of the light beam is substantially normal, as shown in the enlarged right view of FIG. 1. The light beams which reach the two inclined planes 30b-1 and 30b-2 of the V-shaped plane are greatly deflected in different directions due to the incident angles of approximately 45 degrees and reach the photo-detectors 4a and 4b, respectively. In the second region 32, the light beam is divided in the three directions by the three planes of different inclination directions, that is, the two inclined planes each inclined in different direction to the incident light beam and the plane between V-shaped grooves, and the divided light beams reach the photo-detectors 4a, 4b and 4c arranged at the positions corresponding to those planes, respectively. Thus, in the second region 32, the V-shaped grating functions as a light beam splitter.

Figure 6:
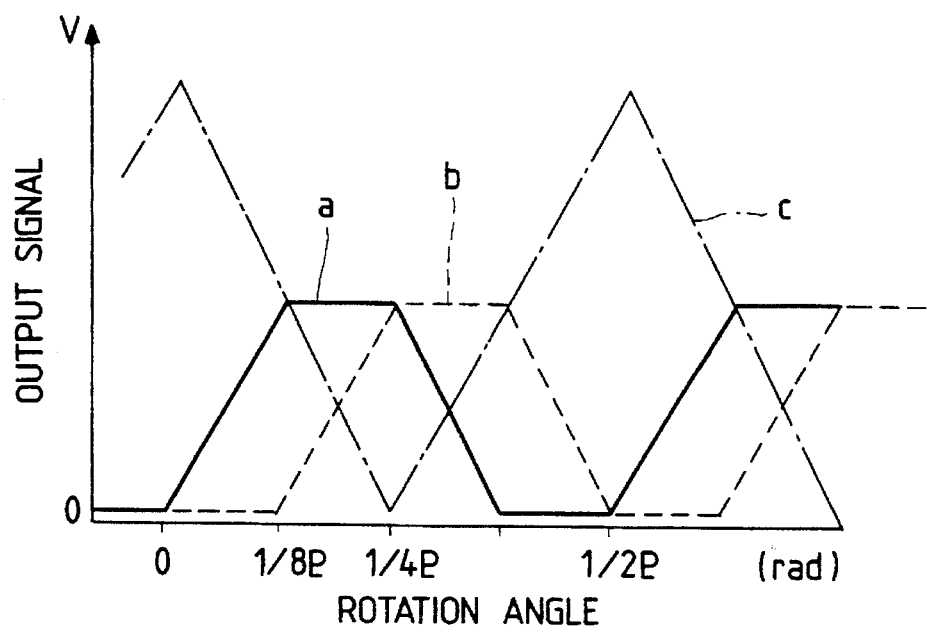
FIG. 6 shows an ideal waveform of an output signal of the encoder of the embodiment.
Figure 7:
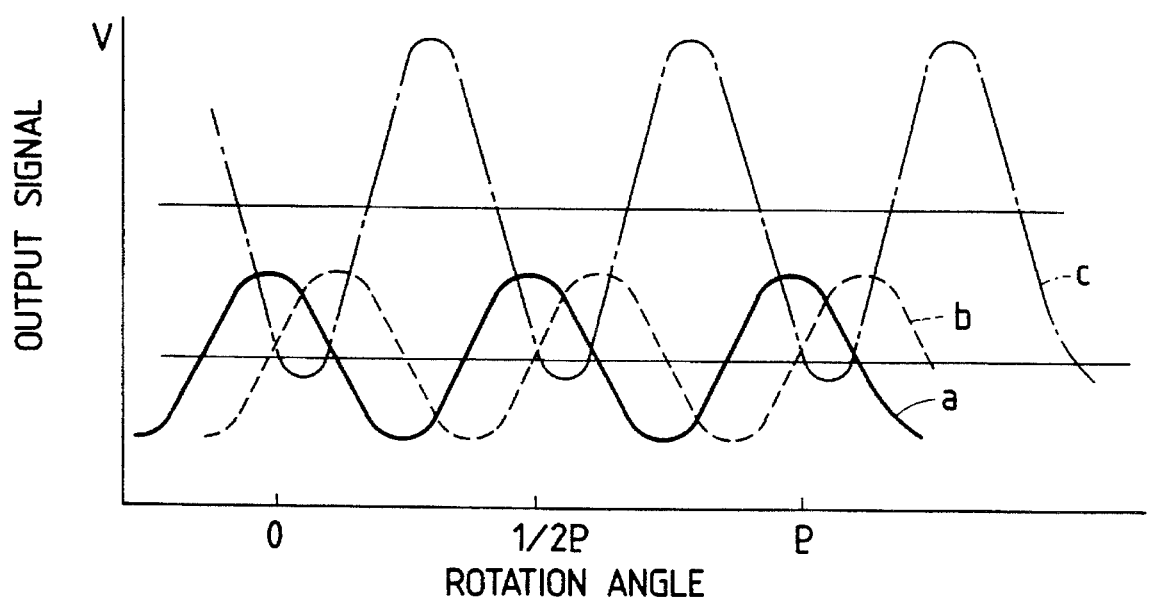
FIG. 7 shows an actual waveform of the output signal of the encoder of the embodiment.

If the scale 3 is rotated, an amount of light detected by the photo-detectors 4a, 4b and 4c will change. The balance of the amount of light incident on each photo-detector changes in accordance with the relative displacement of the positions of the grating and the Fourier image. As a result, when the scale 3 is rotated counterclockwise, the amount of light changes as shown in FIG. 6 as the grating is rotated. In FIG. 6, an abscissa represents a rotation angle of the cylindrical grating and an ordinate represents a detected amount of light. Signals a, b and c correspond to the photo-detectors 4a, 4b and 4c, respectively. When the scale 3 is rotated clockwise, the signal a corresponds to the photo-detectors 4b, the signal b to the detector 4a, and the signal c to the detector 4c. The direction of rotation can be determined by this difference. FIG. 6 shows a theoretical amount of light change, when the contrast of the Fourier image is very high and close to an ideal one. Since the actual contrast of the Fourier image is lower, each amount of light changes substantially sinusoidally as shown in FIG. 7. The rotation information such as rotation angle, rotation speed or rotation acceleration is derived from those signals.

Figure 3:
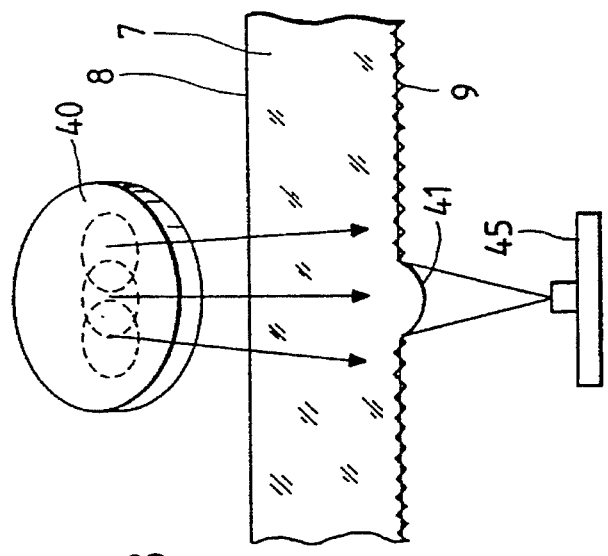
FIG. 3 shows a detail of an optical system for detecting a reference position.

A method for detecting the reference position or the origin point by using the light beam split in the direction T by the half-mirror 40, is now explained in detail with reference to FIG. 3. FIG. 3 shows a detail of the detection optical system for detecting the reference position, which is viewed in the direction I—I of FIG. 2.

The plane 8 at the bottom 7 of the scale on which the light beam is incident, is planar, and the mark 41 for generating the reference position signal is formed at a point on a circumference of a rear surface of the plane 8. The mark 41 comprises a cylindrical lens having a one-dimension focusing action. Said cylindrical plane slenderly extends transversely (normal to the plane of the drawing) to the circumference of the scale. The photo-detector 45 for producing the reference position signal is provided below the mark 41. The entire area except the portion where the mark 41 is formed, is of a light diffusion plane 9 in order to enhance a sensitivity for detecting the reference position, although it is not necessarily the light diffusion plane.

FIGS. 4 and 5 illustrate the detection of the reference position signal. In FIG. 5, the cylindrical lens mark 41 is shifted from the photo-sensing plane 42 of the photo-detector 45. In this case, the light transmitted through the plane 8 is diffused by the diffusion plane 9 so that only a small portion of the light is directed to the photo-sensing plane 42. In FIG. 4, on the other hand, the scale has been displaced from the position of FIG. 4 so that the optical axis of the cylindrical lens of the mark 41 aligns to the photo-sensing plane 42. In this case, the light beam applied to the mark 41 is focused by the cylindrical lens so that a maximum amount of light is directed to the photo-sensing plane 42.

Figure 8:
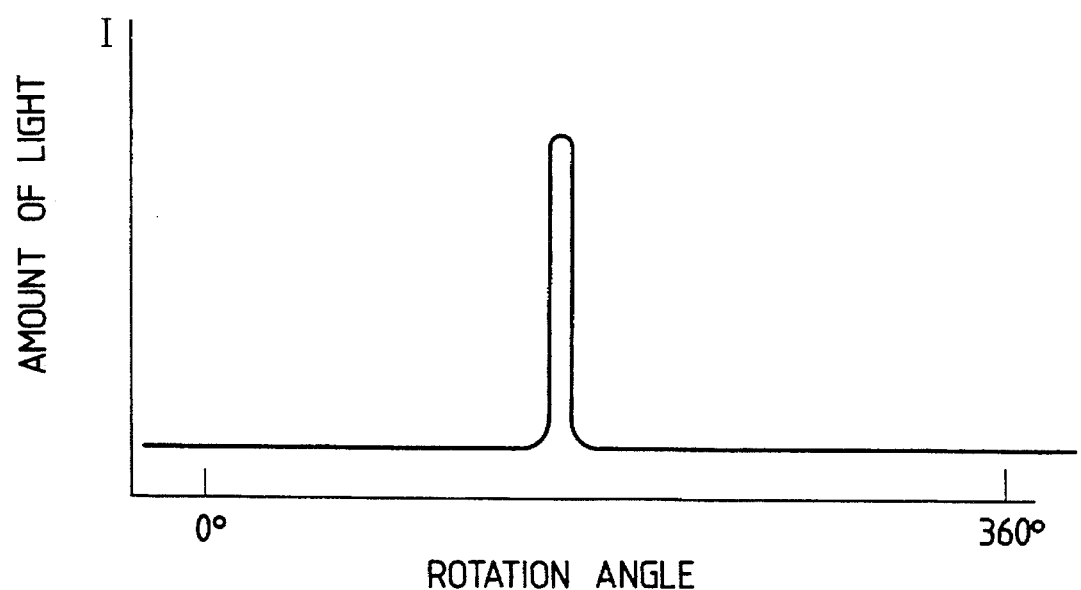
FIG. 8 shows an output waveform from a photo-detector.
Figure 9:
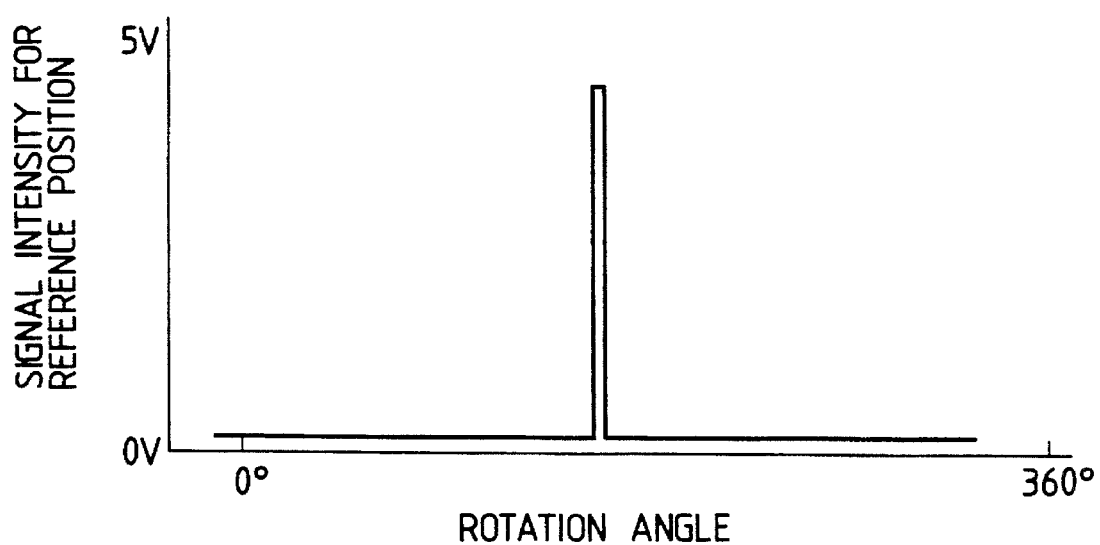
FIG. 9 shows an output waveform of the produced reference position signal.

FIG. 8 shows the change in the amount of light in the photo-sensing plane 42 by the rotation of the slit. Normally, only a small portion of the light reaches the photo-sensing plane 42, and an output of the amount of light is of low level $L_0$. During a short period in which the reference slit passes, the amount of light on the photo-sensing plane 42 is at a maximum. FIG. 9 shows the reference position signal produced by a circuit (not shown) based on the amount of light. Thus, the absolute reference position signal is produced at a predetermined one point in one revolution (360 degrees). When a plurality of marks 41 are provided along the circumference, the plurality of reference position signals are produced in one revolution.

Figure 11:
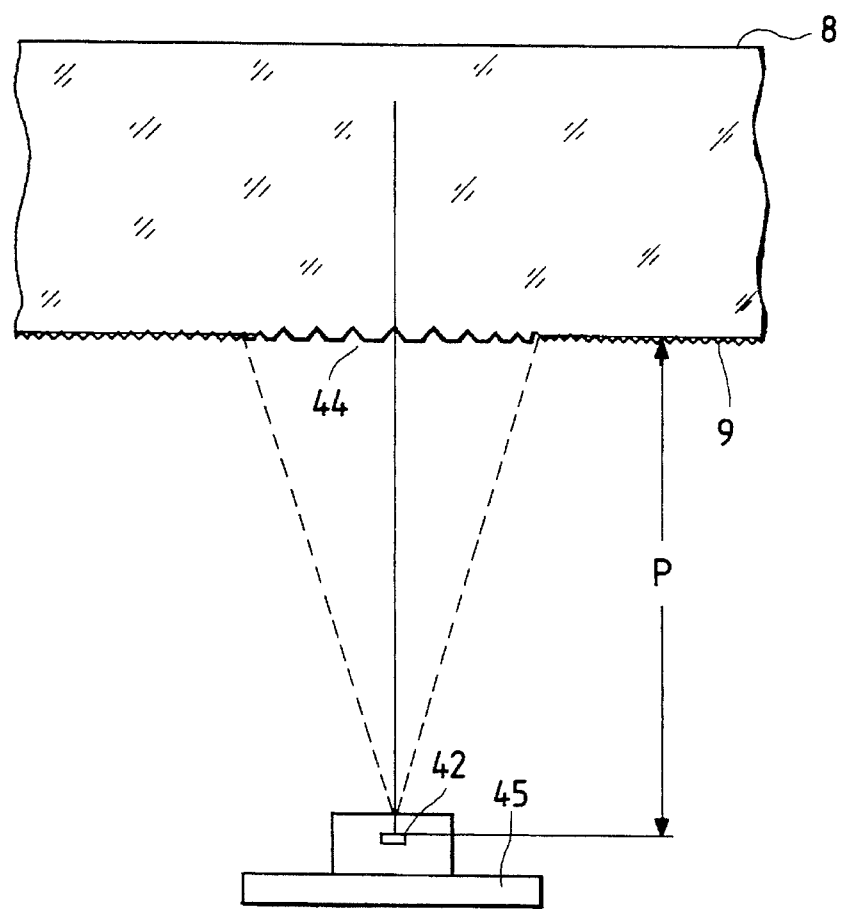
FIG. 11 shows a modification which uses a zone plate.
Figure 12:
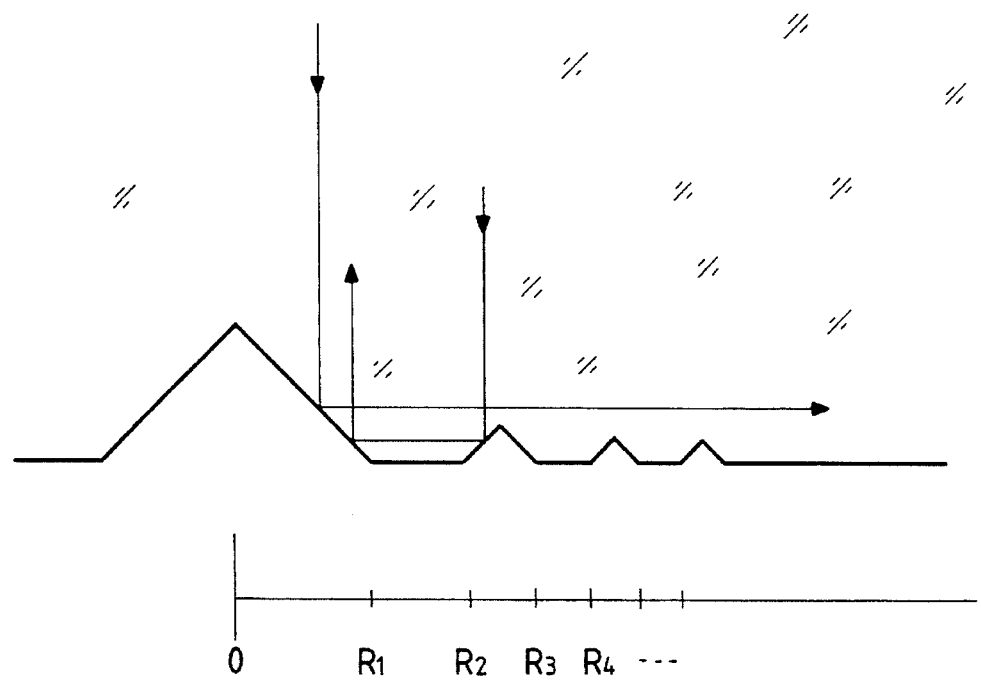
FIG. 12 shows an enlarged view of the zone plate in FIG. 11.

In a modification of the mark 41, a zone plate may be used to attain an equivalent function to that of the above embodiment. FIG. 11 shows such a modification in which the same numerals designate the same parts. A one-dimensional Fresnel lens which corresponds to the cylindrical lens in the above embodiment is formed at a portion on the lower plane 9 of the bottom of the scale to form a zone plate 44 having a focusing function in only the direction of movement of the scale. FIG. 12 shows an enlarged view of the zone plate. In the present modification, it is an amplitude type zone plate among the conventional Fresnel zone plate. A light shielding area is formed by a totally reflection plane as shown in FIG. 12. In the Fresnel zone plate, the light shielding areas and the light transmitting areas are alternately arranged at an interval $R_N$:

$$R_N = \sqrt{\frac{\lambda P}{2}(2N-1)} \qquad N = 1, 2, 3, \ldots$$

where λ is a light wavelength and P is a principal focal distance of the Fresnel zone plate corresponding to a distance from the zone plate 44 to the photo-sensing plane 42 in FIG. 11.

Figure 13:
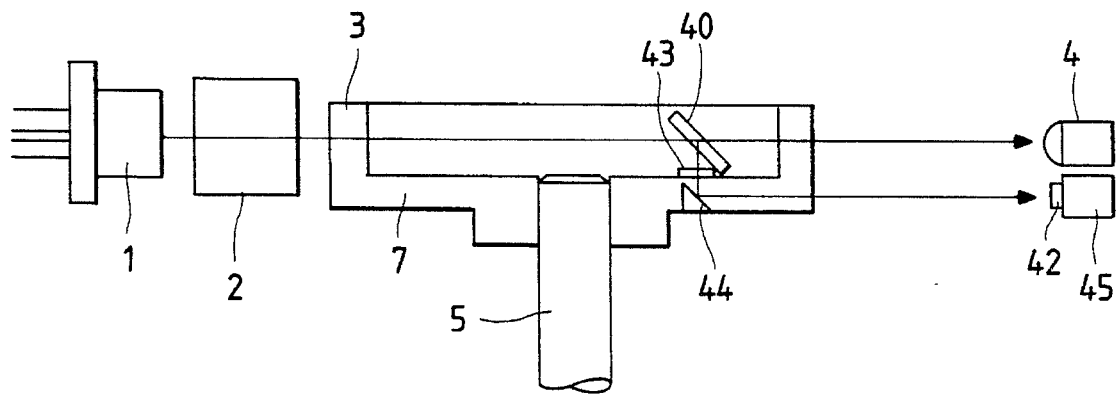
FIG. 13 shows a side view of another embodiment of the present invention.

Another embodiment of the present invention is now explained. FIG. 13 shows a configuration thereof, and the same numerals as those shown in FIG. 2 designate the same parts. It differs from the previous embodiment in that the reference position which is the original point is detected by using the light beam split in the direction T by the half-mirror 40. The photo-detector 45 for detecting the reference position is arranged in parallel to the photo-detector 4 for reading the scale.

Figure 14:
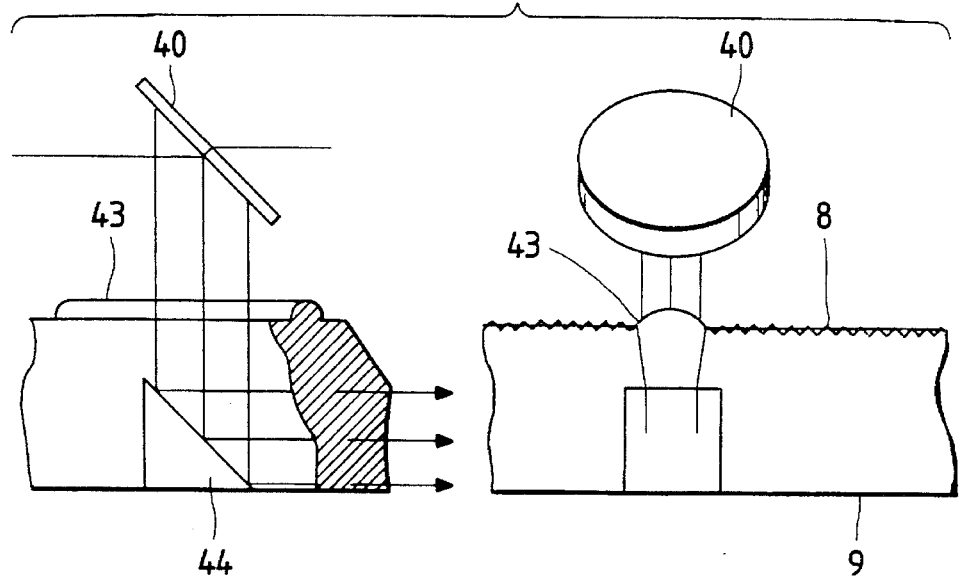
FIG. 14 shows a detail of an optical system for detecting a reference position in FIG. 13.

FIG. 14 shows a detail of the reference position detecting optical system in the vicinity of the mark in the present embodiment. The plane 8 of the bottom 7 of the scale on which the light beam is incident is planar and a mark 43 for detecting the reference position is provided at one point on a circumference on the plane 8.

The mark 43 comprises a cylindrical lens having a one-dimension focusing, or light condensing, function as the mark in the previous embodiment does, and the cylindrical plane slenderly extends in the direction (normal to the plane of the drawing) transverse to the circumferential direction. A notch is formed in the lower plane 9 of the bottom 7 of the scale to form a reflection plane 44 having an inclination of 45 degrees. Since the reflection plane 44 is set at more than a critical angle, it totally reflects the light beam directed from the above in the orthogonal direction to direct it toward the outer side of the cylinder. The reflection plane 44 need not be mirror-finished and is integral with the cylinder grating. Therefore, it is easily manufactured. The light beam reflected at the reflection plane 44 is further focused by the cylinder outer surface to the photo-detector 42. The plane except the mark 43 is the light diffusion plane as it is in the previous embodiment in order to enhance the detection sensitivity.

In FIG. 14, the optical axis of the cylindrical lens of the mark 43 aligns to the photo-sensing plane 42 of the photo-detector 45. In this case, the light beam incident on the cylindrical lens is focused by the lens, so that a maximum amount of light is incident on the photo-sensing plane 42.

In the present embodiment, the reference position signal similar to that of FIG. 6 or FIG. 7 is produced. Further, in the present embodiment, the photo-detector for detecting the reference position signal can be positioned in the vicinity of other photo-detector to further reduce the volume of the detection system.

Figure 15:
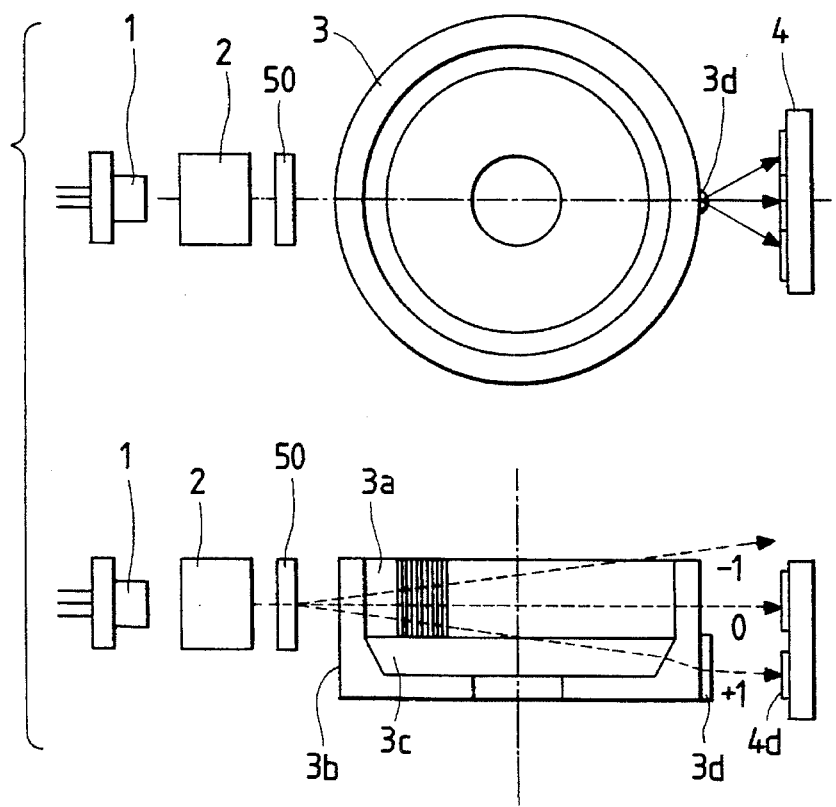
FIG. 15 shows top view and side view of another embodiment of the present invention.
Figure 16:
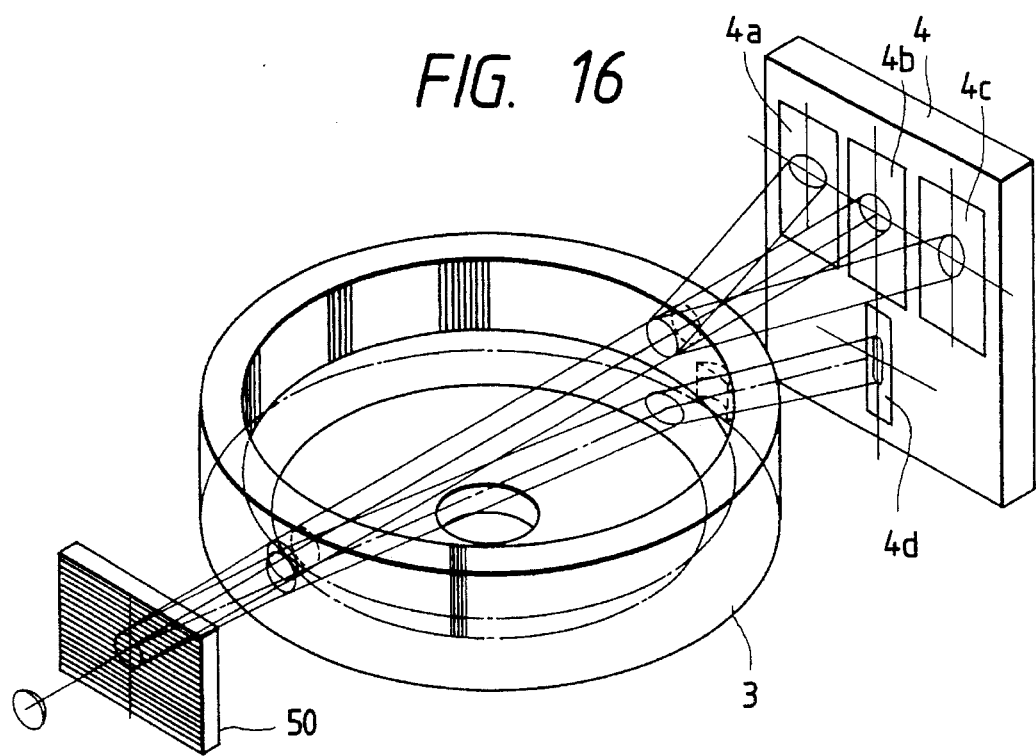
FIG. 16 shows a perspective view of an optical system for detecting a reference position in FIG. 15, FIGS. 17A and 17B show variations of a scale.

Another embodiment of the present invention is now explained. FIG. 15 shows a top view and a side view of the present embodiment. The same numerals as those shown in the embodiment of FIGS. 1 and 2 designate the same parts. The features of the present embodiment over the previous embodiments are the following three points.

(1) In the previous embodiments, the light beam is split by the half-mirror 40 located in the cylindrical scale and the split light beam is directed to the mark which is the reference position, while in the present embodiment, a diffraction grating plate 50 having a beam splitting function is arranged between the lens 2 and the cylindrical scale 3 to split the light beam into three beams (0-order, ±1-order). The direction of arrangement of the grating of the diffraction grating plate 50 is orthogonal to the direction of arrangement of the grating of the scale 3. One of the split light beams (+1-order) in directed to the mark 3d. The 0-order light is irradiated to the grating of the scale 3 and the rotation information is measured by using the Fourier image as it is in the previous embodiment. The -1-order light is an unnecessary light.

(2) The mark (41, 43) is arranged on the bottom of the cylindrical scale in the previous embodiments, while in the present embodiment, a mark 3d is arranged on the outside plane of the cylindrical scale separately from the grating.

(3) The detecting element 4d for detecting the reference position is arranged on a substrate in parallel with the detecting elements 4a, 4b and 4c for reading the scale to form a single photo-detecting unit 4.

The operation to detect the reference position in the present embodiment is explained below. The mark 3d used to detect the reference position is provided at one point on the circumference on the outside plane 3b (on which the light beam is incident) of the scale 3. The mark 3d comprises a cylindrical lens having a one-dimension focusing function as it does in the previous embodiment, and the cylindrical plane slenderly extends in the direction (in the plane of the drawing) transverse to the circumferential direction of the scale. The cylindrical plane is positioned such that only the +1-order deffracted light having passed through the cylindrical scale 3 is directed thereto. The plane except the mark 3d is the light diffusion plane as it is in the previous embodiments. The cylindrical lens may be replaced by the zone plate as it is in the previous embodiment. The pitch of the deffraction grating plate 50 is selected to meet the above condition.

When the +1-order light of the split light beams is irradiated to the cylindrical plane, it is focused on the detecting element 4d. In FIG. 15, the optical axis of the cylindrical lens of the mark 3d aligns with the detecting element 4d. In this case, the light beam incident on the cylindrical lens is focused by the lens, so that a maximum amount of light is incident on the photo-sensing element 4d. In this manner, the reference position is detected.

While the mark 3d is provided on the outside plane 3b of the scale 3, it may be provided on the conical plane 3c to attain the same effect.

In this present embodiment, the same reference position signal as that in FIG. 6 or FIG. 7 is produced. Like in the previous embodiments, the photo-detector for detecting the reference position signal may be arranged closely to other photo-detectors to enhance the volume reduction of the detection system.

Figure 17A:
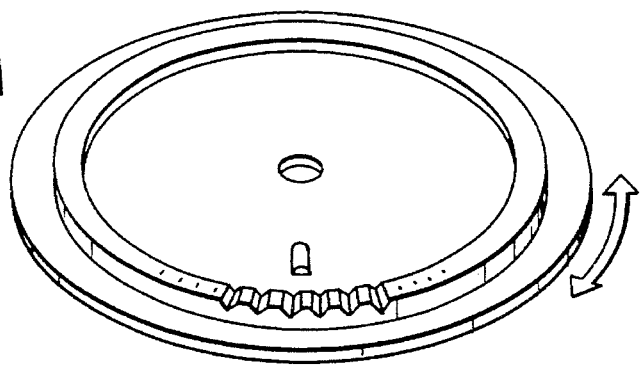
Figure 17B:
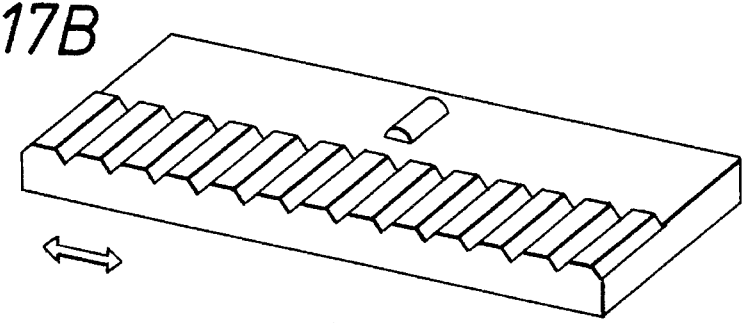

In the embodiments described above, the reference position is detected by using the encoder having the grating formed thereon by forming grooves having inclined surfaces at the constant pitch on the light transmitting cylindrical scale. Alternatively, a rotary encoder having a disk-shaped rotary scale as shwon in FIG. 17A or a linear encoder having a planar linear scale as shown in FIG. 17B may be used to detect the reference position. The scale having the grating and the mark which has the focusing function on the same plane can be formed by the injection molding process. Thus, it is advantageous in the manufacturing cost of the scale. The grating of the scale is not limited to the grooves but it may be of brightness slit type.

In the above embodiments, the mark comprises the cylindrical lens having a focusing, or light-condensing, function or the zone plate, although other members having an equivalent function may be used. While one-dimensional focusing function has been described above, two-dimensional focusing function may be utilized to attain the same function.

Figure 18:
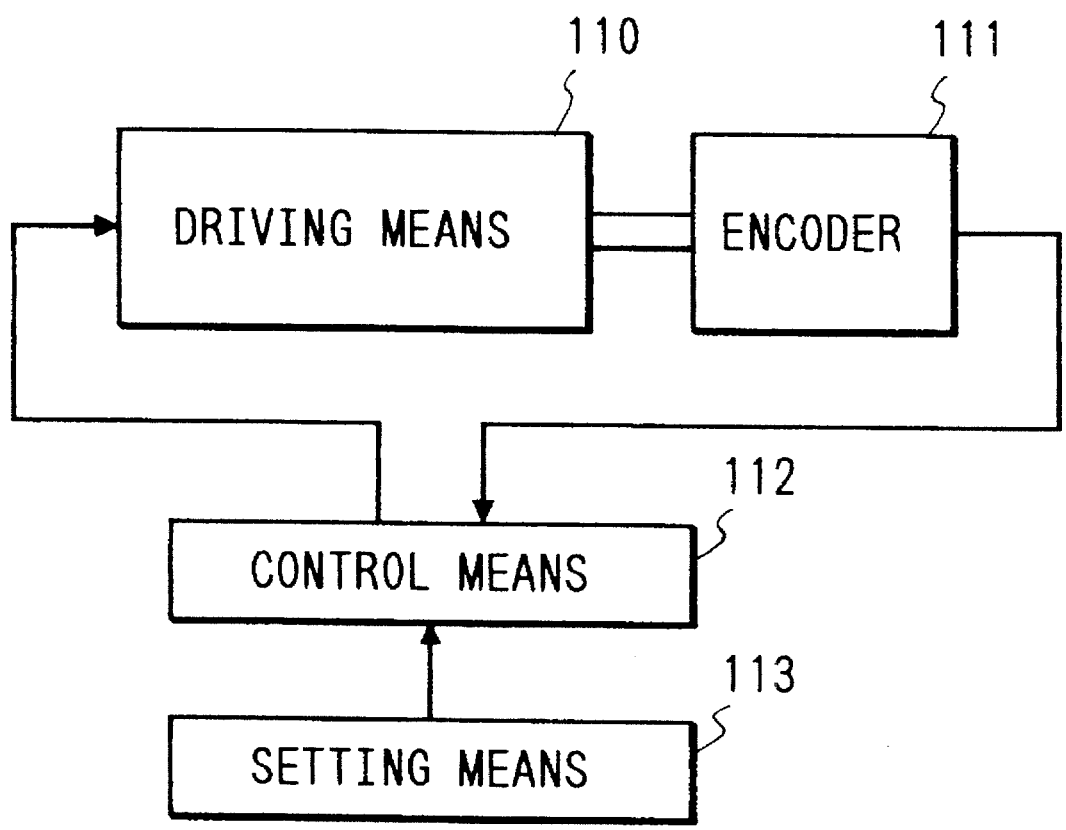
FIG. 18 shows a configuration of a drive system using the encoder.

FIG. 18 shows an example of a system utilizing said encoder. It shows a configuration of a drive system having a rotary encoder. An encoder 111 described above is connected to a rotation output portion of drive means 110 including a motor, an actuator and a drive source such as an internal combustion engine, to detect the rotation status such as a rotation angle or a rotation speed as well as the reference position of rotation. The detection output of the encoder 111 is fed back to control means 112, which sends a drive signal to the drive means 110 so as to attain the condition set by setting means 113. By constructing such a feedback system, the rotation condition set by the setting means 113 is attained. Such a drive system is applicable to various machine tools, manufacturing tools, measuring instruments, robots, cameras, audio/video equipments, information equipments as well as any apparatus having the drive means.

I claim:

1. A displacement detector, comprising:

light generation means for generating a light;

a cylindrical rotary scale having a grating formed on a side plane thereof, wherein the light is irradiated to a first portion on the side plane and directed to a second portion different from the first portion;

first detection means for detecting the light irradiated through said grating in the second portion to detect displacement information of said scale;

a light-condensing portion provided on said scale separately from said grating;

splitting means for spitting the light beam from said light generation means to direct the split light beam to said light-condensing portion through the first portion; and second detection means for detecting the light condensed by said light-condensed portion to detect a reference position of said scale.

2. A displacement detector according to claim 1, wherein said splitting means comprises a diffraction grating.

3. A displacement detector according to claim 1, wherein said light-condensing portion comprises a lens.

4. A displacement detector according to claim 1, wherein said light-condensing portion comprises a zone plate.

5. A displacement detector according to claim 1, wherein said light-condensing portion is provided on the side plane of said scale.

6. A displacement detector according to claim 1, wherein said scale comprises a light transmissive grating having a concave-convex surface inclined to an incident light, with said grating being arranged at a constant pitch.

7. A displacement detector according to claim 1, wherein said light generation means comprises a semiconductor laser.

8. A displacement detector according to claim 1, wherein said light generation means comprises an LED.

* * * * *

UNITED STATES PATENT AND TRADEMARK OFFICE
CERTIFICATE OF CORRECTION

PATENT NO. : 5,506,681
DATED : April 9, 1996
INVENTOR(S) : Igaki

It is certified that error appears in the above-indentified patent and that said Letters Patent is hereby corrected as shown below:

COLUMN 3:

Line 60, "$(N-¼)P^2\lambda<d<(N+¼)P^2/\lambda$ (N: natural number)" should read --$(N-¼)P^2/\lambda<d<(N+¼)P^2/\lambda$ (N: natural number)--.

COLUMN 4:

Line 14, "$p^2/\lambda$" should read --$P^2/\lambda$--.

Signed and Sealed this

Seventeenth Day of September, 1996

Attest:

BRUCE LEHMAN

*Attesting Officer*  *Commissioner of Patents and Trademarks*